US010043411B2

(12) United States Patent
Ohme et al.

(10) Patent No.: US 10,043,411 B2
(45) Date of Patent: Aug. 7, 2018

(54) FILTERS AND RELATED METHODS OF USE IN MEASURING REACTION TIMES

(71) Applicant: NEUROHM Sp. z o.o. Spolka komandytowa, Warsaw (PL)

(72) Inventors: Rafal Krzysztof Ohme, Podkowa Lesna (PL); Adrian Klimek, Warsaw (PL); Michal Matukin, Warsaw (PL)

(73) Assignee: NEUROHM SP. Z O.O. SPOLKA KOMANDYTOWA (PL)

( * ) Notice: Subject to any disclaimer, the term of this patent is extended or adjusted under 35 U.S.C. 154(b) by 239 days.

(21) Appl. No.: 15/051,711

(22) Filed: Feb. 24, 2016

(65) Prior Publication Data

US 2017/0243507 A1    Aug. 24, 2017

(51) Int. Cl.
| | | |
|---|---|---|
| G09B 19/00 | (2006.01) | |
| G09B 17/04 | (2006.01) | |
| G06F 17/30 | (2006.01) | |
| G09B 17/00 | (2006.01) | |

(52) U.S. Cl.
CPC ....... *G09B 17/04* (2013.01); *G06F 17/30867* (2013.01); *G09B 17/003* (2013.01)

(58) Field of Classification Search
CPC .............. G09B 19/00; G09B 7/06; A61B 5/16
See application file for complete search history.

(56) References Cited

U.S. PATENT DOCUMENTS

| | | | |
|---|---|---|---|
| 8,052,425 B2 | 11/2011 | Hurling | 434/236 |
| 8,696,360 B2 | 4/2014 | Cvencek et al. | 434/236 |
| 2013/0302773 A1 | 11/2013 | Cvencek et al. | 434/335 |

*Primary Examiner* — Omkar Deodhar
(74) *Attorney, Agent, or Firm* — Renner Kenner Greive Bobak Taylor & Weber

(57) ABSTRACT

A system for filtering results from tests that include reaction time as part of the test results includes an input device that receives respondent input in response to queries. A task engine is associated with the input device and the task engine presents the queries and receives the respondent's input to the queries, and associates a reaction input time for each of the respondent's inputs. A results database receives the respondent's input and the associated reaction input time. At least one filter is associated with the task engine which compensates for artifacts that adversely affect the associated reaction input time.

12 Claims, 12 Drawing Sheets

FILTERS AND RELATED METHODS OF USE IN MEASURING REACTION TIMES

TECHNICAL FIELD

Generally, the present invention relates to conducting reaction time tests, of which there are many types, such as an implicit-association test (IAT), on various types of computing input devices. Specifically, the present invention relates to the application and use of filters depending on the specific type of test and the specific input device used by the test. In particular, the present invention relates to filtering results from a test that uses reaction times or response latency measures.

BACKGROUND ART

Reaction time tests test the strength of a test subject's mental associations between concepts and ideas, or strength and accessibility of a given attitude, based on the test subject's performance on tests during which the subject answers or responds to a query or a series of queries while the speed of these responses is gathered. As used herein, the term query refers to any written or verbal question, statement, prompt, test, task, request or the like that the subject is presented with and wherein the subject then makes some type of response to, which may be a physical action, a verbal reply (wherein no verbal reply may be considered a response), or the like depending upon the type of query presented. For example, an implicit-association test (IAT)—the most popular reaction time based method—in some scenarios may be administered via a computing system in which the queries are presented on a graphical display and the subject classifies the stimuli using manual input via a keyboard or other input device such as a touchpad or computer mouse.

While IATs are effective in evaluating strengths of association between various concepts and categories held by reasonably well-educated adults, the standard IAT format has proven difficult or impossible to administer to various other categories of test subjects.

Such testing scenarios are legitimate when the test is conducted on a computer when a keyboard is used as the input device. In one IAT scenario, using a standard keyboard, the subjects or respondents are instructed to position an index finger of their left hand over the first response button ("E") while the index finger of the right hand is positioned over the second response button ("I"). Other IAT tests can supposedly be conducted with other input devices. In other words, such tests can be utilized with dedicated hardware devices but also with a commonly accessible mouse, touchpad or touchscreen. However, it is believed that if an IAT is conducted using a mouse, touchpad or touchscreen, motor artifacts may distort the result and the data cannot be treated as valid as it is not possible to fulfill the instruction of 'fingers positioning' (e.g. with touchscreens) or there is only one cursor/indicator that deputizes fingers in the process of providing the answer (e.g. with a mouse). As used herein, artifacts refer to any distortion of any feature of the testing process (the queries, the input device, the format of the answers provided, etc.) that is a product or result of an extrinsic agent, method, or the like. Artifacts may be generated by the environment of where the test is being taken, the characteristics of the input device, the format of the test (type of query, response button placement, etc.), the physical or cognitive characteristics of the individual taking the test, or other related factors.

As best seen in FIG. 1, a Prior Art configuration of a system representing a reaction time type of test is shown in FIG. 1 and designated generally by the numeral 18. The system 18 includes a computer 20 connected to a monitor 21 or other display device that is visually perceptible. Also connected to the computer is an input device 22. The computer may be any processor-based device with the appropriate hardware, software and memory needed to implement the reaction time test or tests and implement other functions associated therewith. The monitor 21 may be any type of device which visually displays information or images to a subject or respondent. The monitor 21 may be in any form, such as by way of example only, an LCD or LED display. The monitor may also be in the form of a capacitive or similar touchscreen display as is commonly found on smartphones and tablet computing devices. The monitor 21 may be any device that can present some type of query to a respondent, sometimes referred to as a subject. The input device 22 can receive and save any response or input from the subject. The computer 20, the monitor 21 and the input device 22 may be integral with each other or separate and discrete components linked to each other by wires or wirelessly. Such a configuration (computer 20, monitor 21, input device 22) may include, but is not limited to: a tablet; mobile devices; phones; smartphones, touchscreen devices; a personal computer with an associated mouse and/or a keyboard; a laptop computer; a virtual reality system; a gaming input controller, smartwatch, TV screen, microphones and the like. As used herein, the input device is a device which the respondent manipulates in response to a query. For example, if a personal computer is used as the input device, the computer monitor or display presents the query and the input device (the keyboard, mouse, touchpad and/or touchscreen) receives the user's input and the computer 20 receives and collects the information from the mouse, touchpad, etc., for subsequent transfer. In the case of a smartphone or tablet with a touchscreen, the touchscreen (monitor 21) presents the query and also receives the user's response (input device 22) for subsequent transfer. Signals or data collected from or entered into the input device, which may also be referred to as respondent input, are transferred via a conduit 23. The response may include, but is not limited to, raw data, answers, times associated with providing the answers, and the like. Generally, a query or series of queries is presented on the monitor or a display associated with the input device to the respondent which requires an answer, or answers, which may or may not be provided as an option in response. The response may also require a physical movement such as pressing the button, moving a computer mouse, interacting with a touch screen or the like. Specifically, answering the query may require a specific physical action such as pressing a key on a keyboard, clicking or dragging an object as is done with a computer mouse, pressing the subject's finger on a touchscreen and/or moving their finger, or using voice commands as necessary in order to be responsive to the query.

A task engine 26, which may be maintained by the computer 20, receives the subject's response by the conduit 23. Moreover, it is the task engine that generates and presents a query 28 to the monitor or other presentation medium associated with the input device. In essence, the task engine 26 defines the process that is necessary—reactions that need to be taken—to gather data in response to queries or the performance of a task using the input device. In other words, the collection of data associated with the task engine 26 relates to asking a query of every respondent that interacts or interfaces with the user input device 22. The task engine includes at least a query or series of queries, answer options, a format for the answer, related options, and the like. Specifically, the task engine 26 provides a specific task, typically in the form of a query 28. As soon as the query 28 is presented on the monitor 21 or otherwise presented, which may be verbally, a timer starts to determine a reaction time 30. As soon as the user provides a response 32, the query timer is stopped. The response 32, which may be either positive, negative, or a selection of a number of choices, is associated with the query 28 and the reaction time 30. Upon completion of the response 32 the task engine may provide a cooling time 34 which is a time period between when the response is given to allow the respondent to reposition an input device, such as a cursor, and/or await the next presentation of another query 28.

Upon completion of a specific task or predetermined number of tasks the collected data from the task engine 26 is delivered via an output signal 35 to a results database 36. The collected data includes at least an identification of the respondent, information related to the subject matter and iteration of the test, identification of the queries, the reaction time, and the response. Other data, including but not limited to the type of monitor and/or devices used, software used, cooling time, environmental factors such as time of day, physical conditions of where the test was administered, socio-demographic characteristics of subject and so on may also be associated within the collected data. The data or information in the results database may then be presented, organized in any desired format or further manipulated or analyzed. As will be appreciated by skilled artisans, the results database 36 may include the processed (cleaned) data transformed into meaningful scores or relationships. In other words, the collected data may be presented in the form of the processed answers on respondent level or aggregated processed answers gathered from a whole group of respondents. As a result, each reaction time test may be provided to more than one user so that trends or characterizations of the test can be determined for comparison to other tests or evaluation.

It has been found that if a test or task is conducted using a particular input device that various data artifacts may result. For example, a person using a regular keyboard may provide different input or reaction times than that same person utilizing a mouse, touchpad or touch screen. As a result, these variations, which result from motor artifacts or other "noise" 40 introduced into the system 20 may distort the results and the collected data cannot be treated as valid.

Therefore, there is a need to remove the noise and artifacts caused by input devices, the respondents themselves, and/or other environmental concerns. This is particularly important if a test which uses reaction time methodologies (either similar to implicit association tests or some other type of reaction time measurement) is not conducted in a controlled academic condition but in a more natural environment and/or when the target group is the general public where internal (individual differences in: motor activity, temperamental capabilities, difference in speed of the nervous system, familiarity with the device, speed of reading, etc.) and external (situational aspects, disturbances which occur when the study is taken, etc.) noise from various sources needs to be taken into consideration and its' influence on the results should be minimized to receive valid data. Indeed, because the test may be accessible through various devices (PCs, laptops, tablets, smartphones, etc.), different means of input may be used by the respondents instead of a keyboard. In such cases various artifacts can occur and thus result in distortion of the data collected. Therefore, there is a need to implement various filters to accommodate for these variations in input devices and how the queries are presented and answered on the input devices. There is also a need to take into consideration various types of the sources of noise and distortions.

SUMMARY OF THE INVENTION

In light of the foregoing, it is a first aspect of the present invention to provide filters and related methods of use in measuring reaction times.

It is another aspect of the present invention to provide a system for filtering results from tests that include reaction time as part of the test results, comprising an input device that receives respondent input in response to queries, a task engine associated with the input device, the task engine presenting the queries and receiving respondent's input to queries and associating a reaction input time for each respondent's input, a results database for receiving the respondent's input and the associated reaction input time, and at least one filter associated with the task engine so as to compensate for artifacts that adversely affect the associated reaction input time.

Yet another aspect of the present invention is to provide a method for filtering test results that include a reaction time as part of the result, the method comprising presenting by a task engine a query or series of queries to a respondent, determining a reaction time for the respondent using an input device to reply to the query, associating at least one filter with the task engine, wherein the at least one filter includes a filter timer that generates a filter time specific to the respondent and the input device, and associating the query, the respondent's input, the respondent's input reaction time in responding to the query, the filter time, and the input device with one another in a results database.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Generally, the embodiments set out below are utilized with a system that implements timed tests sometimes referred to as a reaction time test or an implicit-association test (IAT). Skilled artisans will appreciate that the embodiments set out below may be utilized with any type of test or task where a respondent or subject is presented with a query and the subject responds to that query and wherein the reaction time or response latency is measured. Variables associated with each test or query, such as the environment, the mental or physical condition of the subject, the type of input device, and how the query is presented, may be associated with each test. Skilled artisans will further acknowledge that each test may have an artifact, distortion, or some other "noise" that may adversely impact the subject's responses and/or the test results. In order to minimize these artifacts, distortions, or adverse factors, filters may be utilized with the system to correct or minimize the undesired factors and/or minimize the risk of data distortion. The filters described below may be used separately or, in some embodiments, may be combined with one another. In other words, each filter may be used singly, or two or more selected filters may be used with one another, or all of the filters may be utilized together. Moreover, some of the filters described below may be applied prior to the test (pre-filters), during implementation of the test (concurrent filters), or after the test (post-filters). And in some embodiments, the filters may be applied selectively during any one of the aforementioned phases of the test. The test results may then be aggregated to ensure that the subject or subjects are within certain norms or that the subject or subjects taking the test are qualified to take the test. The results may also be used to adjust the subject's score or performance on a test. For instance, the respondents may be under influence of an alcohol or other substances which impairs or modifies their original reaction times and then this influence needs to be taken into consideration either by not allowing them to take part in the test or by adjusting their baseline.

Figure 1:
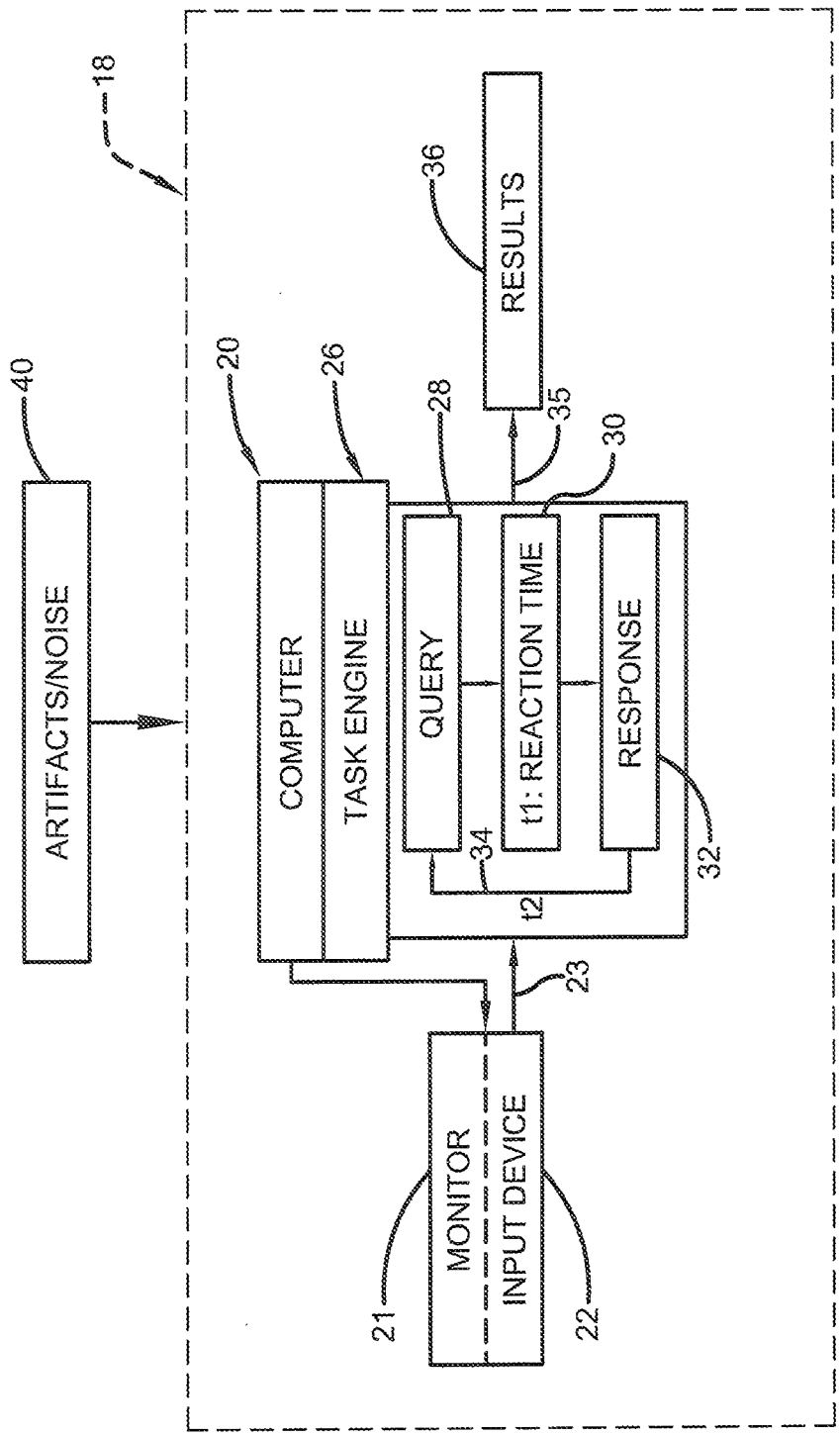
FIG. 1 is a block diagram of a Prior Art reaction time test system with introduced artifacts and/or noise.
Figure 2:
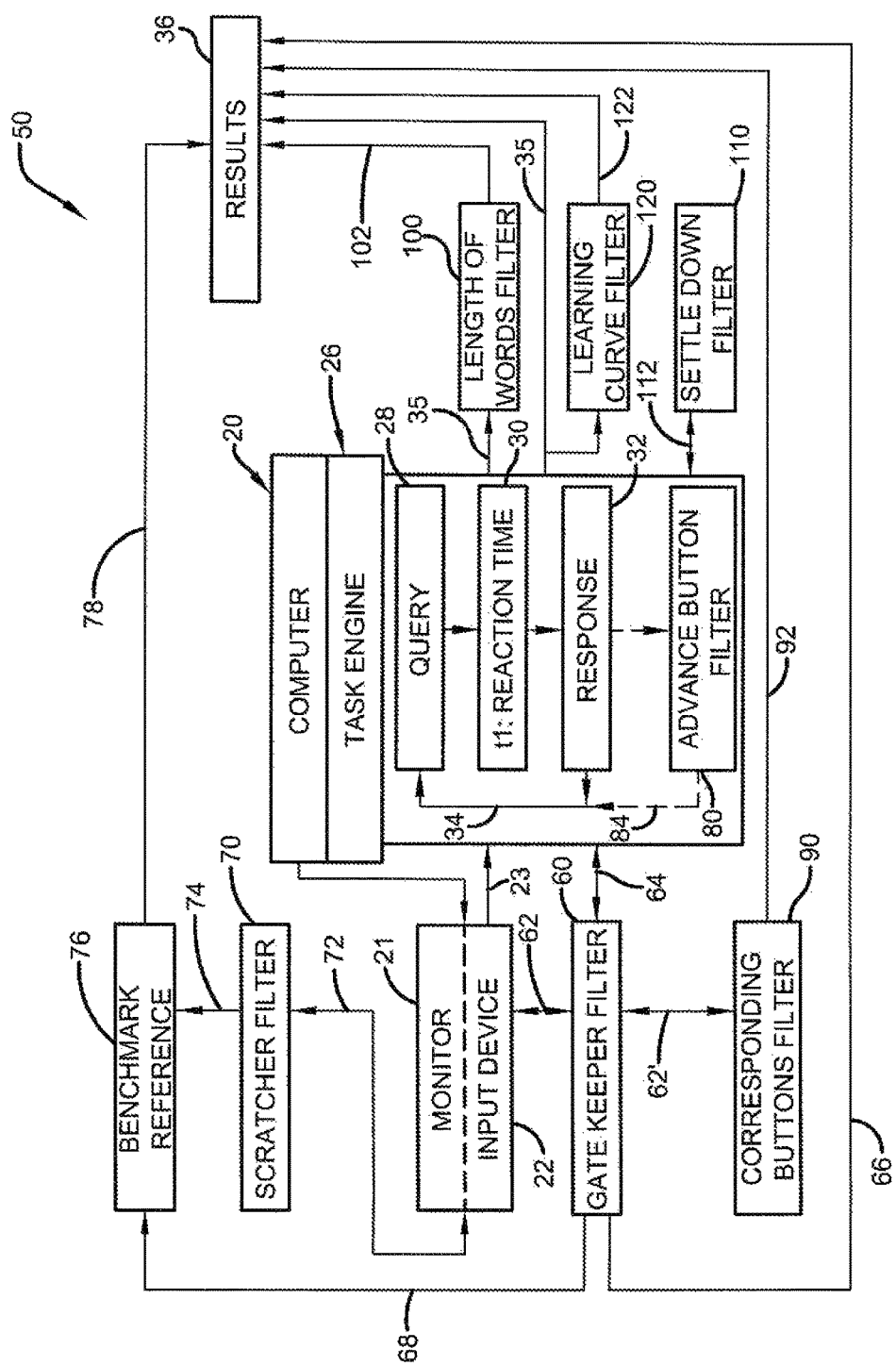
FIG. 2 is a block diagram of a system for filtering results of a reaction time test according to the concepts of the present invention.

Referring now to FIG. 2, it can be seen that a system for filtering a test that uses either reaction time or response latency measures is designated generally by the numeral 50. The system 50 is structured similar to the system 18 as described above, but also in conjunction with a number of filters. Generally, the filters are elements that make the reaction time or response latency measure test more robust and more reliable. The filters are applied at different stages of the testing process and may be associated with different components within the system. More importantly, the filters are incorporated in the testing process of the response latency measurement. The results from the filters may then be further processed to improve the test results over the results that would otherwise be obtained without the filters.

The system 50 may include in any combination, as mentioned above, a gatekeeper filter 60 (pre-filter), a scratcher filter 70 (pre-filters), an advance button filter 80 (concurrent filter), a corresponding buttons filter 90 (pre-filter), a length of words filter 100 (pre-filter), a settle down filter 110 (pre & concurrent filter), and/or a learning curve filter 120 (post-filter). Skilled artisans will appreciate that the system 50 and any associated filters may be provided as part of the computer 20 or as part of computing devices appropriately linked with one another. Implementation and operation of these filters is described below.

Figure 3:
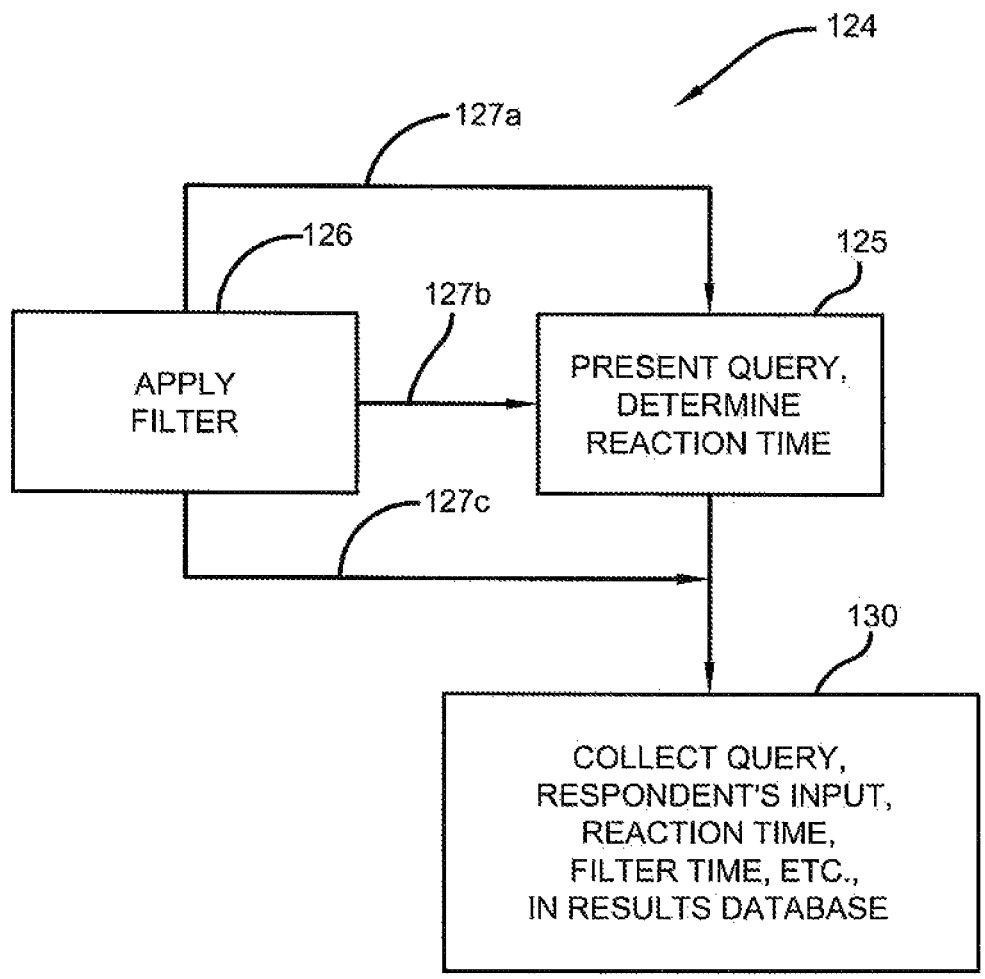
FIG. 3 is a flowchart illustrating the steps used by the system for filtering results of a reaction time test according to the concepts of the present invention.

Referring now to FIG. 3, a top level flowchart showing the steps for implementing the system 50 is designated generally by the numeral 124. At step 125, the task engine 26, as part of the computer 20, the monitor 21 and the input device 22, presents a query, gathers the response and determines a reaction time, as will be described in more detail. Depending upon the type of filter or combination of filters to be used, step 126 applies a filter or filters in conjunction with the presentation of the query at step 125. If the pre-filters are to be applied, then the apply filter step 126 presents those pre-filters along signal line 127a to the presentation step 125. If the filters are to be applied concurrently with operation of the task engine 26, then those filters are applied along signal line 127b. And if the filters are to be applied after running of the task engine and presenting the appropriate query and receiving the subject's response, then the post-filters are applied along signal line 127c. All of the data associated with operation of the task engine and the application of the appropriate filter or filters then proceeds to step 130 where the results database 36 collects the query, the respondent's input, the reaction time, the filter time associated with each filter and any other related information related to application of the filter, presentation of the query, the response, and the reaction time for later analysis.

As will be described in detail below, the method associated with the flowchart 124 provides for filtering test results that include a reaction time as part of the result. Initially, a query is presented to a respondent through the task engine and an input device is used and then a reaction time is determined for the respondent to reply to the query. The methodology includes associating at least one filter with the query, wherein the filter includes a filter timer that generates a filter time specific to the respondent and the input device. Finally, the query, the respondent's input, the respondent's input reaction time in responding to the query, the filter time and the type of input device used are correlated or associated with one another in the results database. This information can then be used by personnel evaluating the results obtained from the task engine and/or associated data used in determining whether the respondents are appropriate for such a test given the history of similar respondents and/or queries presented by the task engine.

Referring back to FIG. 2, it can be seen that the system 50 implements a pre-filter in the form of the gatekeeper filter 60 which communicates with the input device 22 by a filter signal 62. The gatekeeper filter 60 is used to determine the respondent's or subject's ability to take part in the test with regard to his or her psycho-physiological condition. Such conditions may be related to alcohol consumption or other substance that may have an adverse or enhancing reaction on the test subject. The gatekeeper filter tests the respondent's mental state and perceptual fluency in deprived conditions, attentional skills, sensorimotor integration and level or arousal (natural, chrono-biological, evoked by stimulants, or the like). The gatekeeper filter 60 works with the input device 22. The monitor and/or the input device presents the gatekeeper filter 60 to determine whether a negative outcome or a positive outcome is generated. If a negative outcome is generated then the testing of the subject is relayed by a signal line 66 to the results database 36 and the test is terminated. However, if the outcome is positive, according to predetermined criteria, the positive outcome is presented to the task engine by a signal line 64 where the associated tasks or questions are performed by the subject and then transferred to the results database 36.

Figure 4:
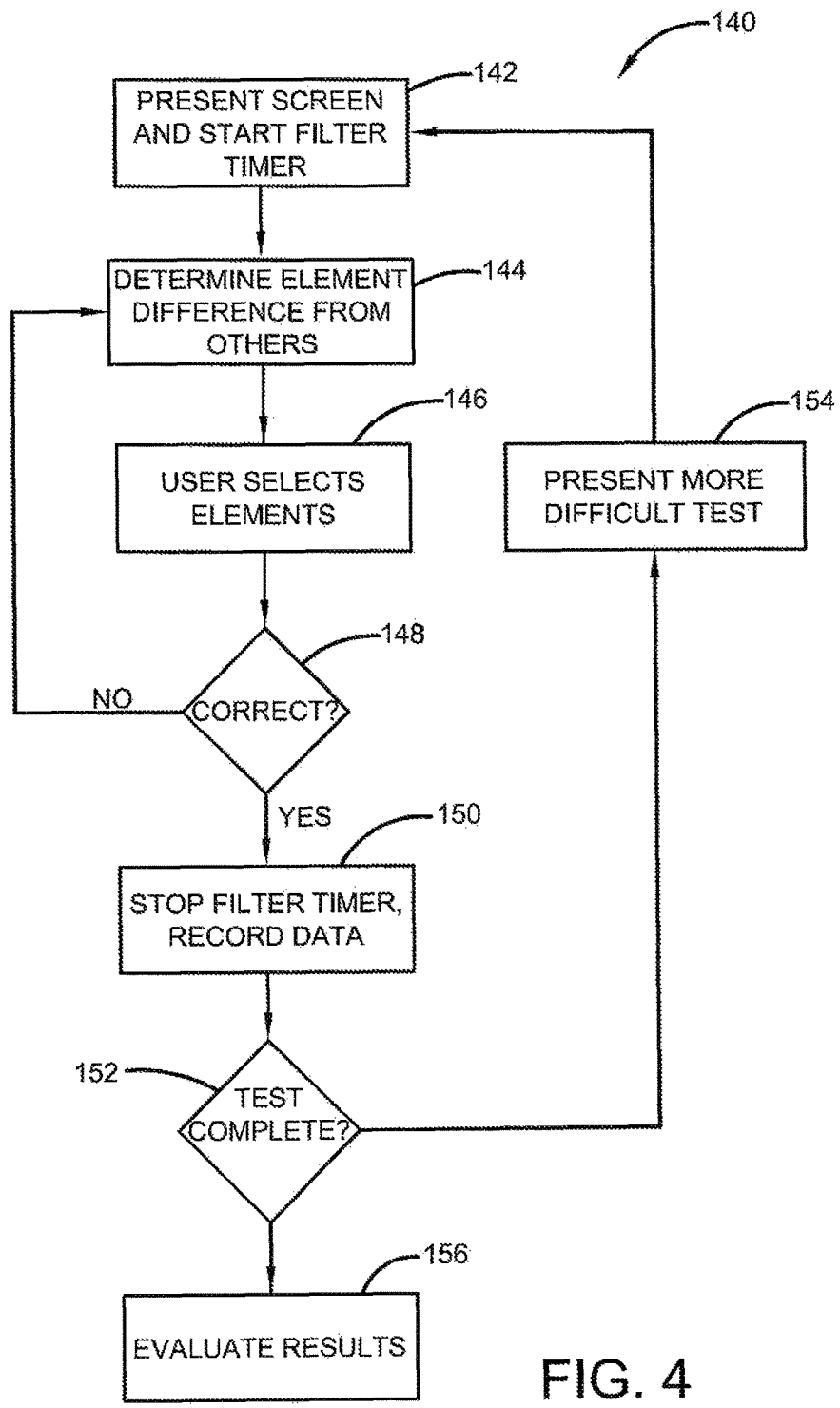
FIG. 4 is a flowchart illustrating the steps for implementing a gatekeeper filter with the system according to the concepts of the present invention.

Referring now to FIG. 4, the steps utilized to implement the gatekeeper system are shown and described in a flowchart designated generally by the numeral 140 which includes presenting a screen with a question or other query and starting a filter timer at step 142. Next, at step 144 the subject is requested to determine if a displayed element is different from other elements presented. Next, at step 146 the subject selects a particular element and then at step 148 the processor associated with the input device determines whether the subject's response is correct or not. If the subject's response is not correct, then the process returns to step 144. If the subject's response is correct at step 148, then the filter timer is stopped at step 150 and the appropriate data is recorded. Next, the task engine 26 determines whether all of the filter queries required are completed or not at step 152. If not, or if the test results are determined to be too easily completed, the process proceeds to step 154 where a more difficult task or query may be selected for the user to take. However, if it is determined at step 152 that the test is complete then the process continues to step 156 where the subject's test results are sent to the results database 36 and evaluated.

In one embodiment, a series of twenty or any number of screens are presented to the respondent wherein the respondent is required to recognize and indicate one element which is different from the other elements presented on the screen. The level of complexity may be increased in each of the subsequent screens such that the first screen task is the easiest while the last screen task is the most difficult. The length of time it takes the respondent to indicate the correct answer for each screen is recorded and then compared to a benchmark figure. In one embodiment, the gatekeeper filter 60 may send the results (answer, filter time, etc.) via a signal line 68 to a benchmark database 76 for evaluation and comparison to other results. In an alternative embodiment, the results from the gatekeeper filter 60 may be transferred through the input device and the scratcher filter 70 to the benchmark database 76. The total score is determined by correct answers and/or the filter time required to correctly answer the query or to complete the task presented. If the subject's score for the individual tests are outside predetermined threshold levels, the subject or respondent is not allowed to proceed with the substantive portion of the test presented by the task engine 26. The results collected in the result database 36 and/or the benchmark database 76 are gathered for the benchmark analysis. The results are not applied to the current test scores but can be compared to historical data and in revising the benchmark references.

Referring back to FIG. 2, another type of pre-filter is designated as the scratcher filter 70. Generally, the scratcher filter 70 serves as an arousal measure to establish the current state of the respondent's excitement. The respondent's precision and speed are measured to establish their sensorimotor integration and level of arousal (natural, chrono-biology, evoked by stimulants, etc.). In addition, the scratcher filter also serves as sensory activation and preparation for precision activities that may be presented by the task engine 26 in a later test.

The scratcher filter 70 receives a filter signal 72 from the input device 22. The scratcher filter 70 implements a pre-filter and the associated results are transferred via a signal line 74 that includes the result data to the benchmark reference database 76. These benchmark references may then be sent by a signal line 78 to the results database 36. The data from the scratcher filter 70 allows for comparison between tests for the same respondent or different respondents.

Figure 5:
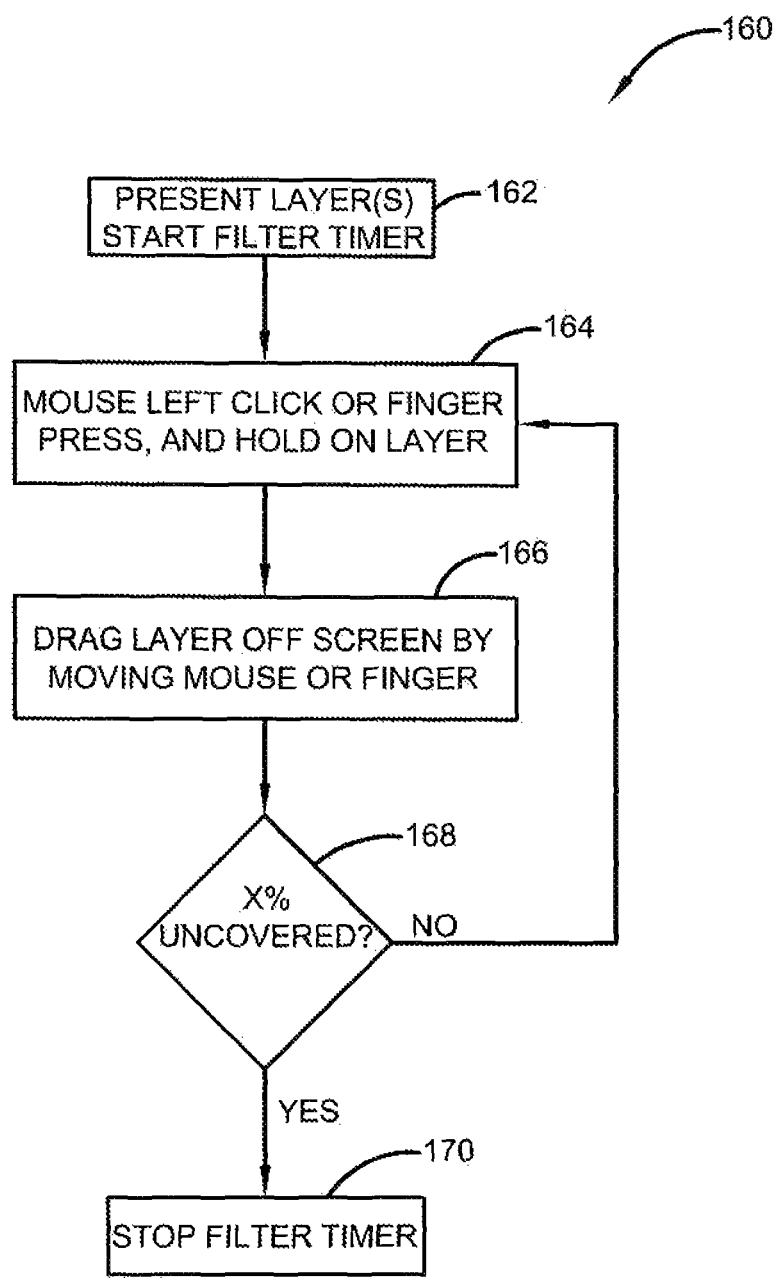
FIG. 5 is a flowchart illustrating the steps for implementing a scratcher filter with the system according to the concepts of the present invention.

Referring now to FIG. 5, implementation of the scratcher filter is designated by a flowchart 160. The flowchart 160 includes a first step 162 of presenting a number of virtual layers to the subject on the monitor 21 and starting a filter timer. Depending upon the input device, at step 164 the respondent first selects a particular layer. This may be done by utilizing a mouse input device with a mouse button depress and hold action or by utilizing a touchscreen type device with a finger press and hold on a particular layer. Next, at step 166 the respondent drags the selected layer off of the screen by moving the mouse cursor or respondent's finger. Next, at step 168, the task engine determines whether a particular percentage of an underlying image has been uncovered or not. If not, then the process returns to step 164 and the respondent is presented with the remaining layers for removal. Returning to step 168, if a predetermined percentage of the underlying image has been uncovered, then at step 170 the filter timer is stopped. This data is then provided to the benchmark reference database 76.

By removing the layers virtually, the respondent slowly uncovers photographs or images of stimuli to be tested. In one embodiment the respondent must uncover 50% of each stimuli before he or she can proceed to the next stimuli as part of the scratcher filter or on to the substantive test or task maintained by the task engine 26. The respondent's scores are included in a benchmark analysis which allows for comparison of the scores between tests for the same respondent, thereby reducing the influence of situational aspects.

Referring back to FIG. 2, the system 50 includes an advance button filter 80 which is maintained within the task engine 26. The advance button filter is implemented concurrently with testing of the respondent as will be described. As previously described, the task engine 26 by way of the monitor 21 presents the question 28 and starts a query timer which stops when the response 32 is provided. The time period is referred to as the reaction time 30. Once the response is entered by the respondent, the task engine 26 implements the advance button filter 80 and upon completion of the task presented by the advance button filter, a cooling time 84 is generated and then the respondent proceeds to a next question. Upon completion of all the test questions and associated use of the advance button filter 80 the task engine data 35 is transferred to the results database 36.

Figure 6A:
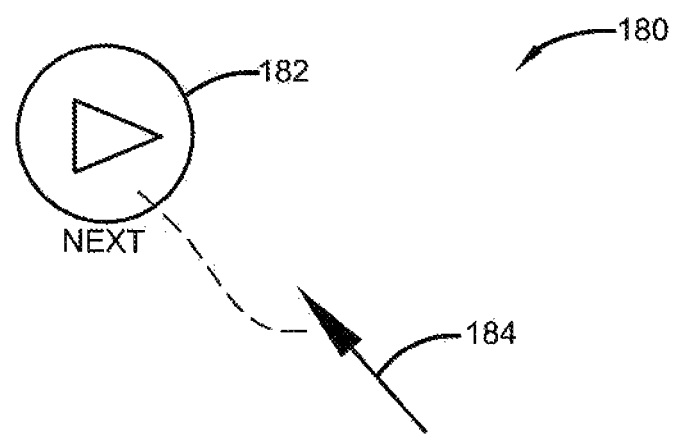
FIGS. 6A and 6B present screen displays utilized with an advance button filter according to the concepts of the present invention.
Figure 6B:
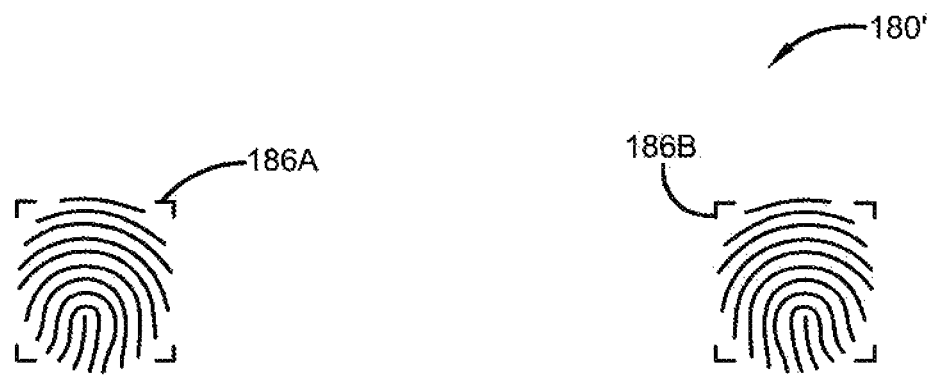

Referring now to FIGS. 6A and 6B, an example of the advance button filter is presented. FIG. 6A shows a display screen 180 that is presented after the respondent answers the task or query 28. FIG. 6A shows a display screen 180 which presents a "NEXT" button 182. The button 182 is spaced equidistantly apart from the answers that appeared on the screen for the previous task or query. A cursor 184, which is movable by the subject via a computer mouse or a touchscreen tap, depending on the input device, allows the subject to move the cursor to the button 182. Once the button 182 is actuated by a mouse button click, a touchpad click or a finger tap, the next query is displayed to the subject. In an alternative embodiment, the screen 180', shown in FIG. 6B, may present two fingerprint icons or buttons 186A, 186B for when the display screen is a touchscreen, smartphone or tablet that utilizes more than one cursor. As such, the buttons 186A,B are placed about the same distance from the answer or answers used in the previous query. Either embodiment minimizes the influence of cursor/finger movement from one answer to another and reduces the effect of button positioning. In case of presenting two buttons 186A, B the respondent has to click both fingerprint icons or both buttons at the same time to proceed to the next query.

Figure 7:
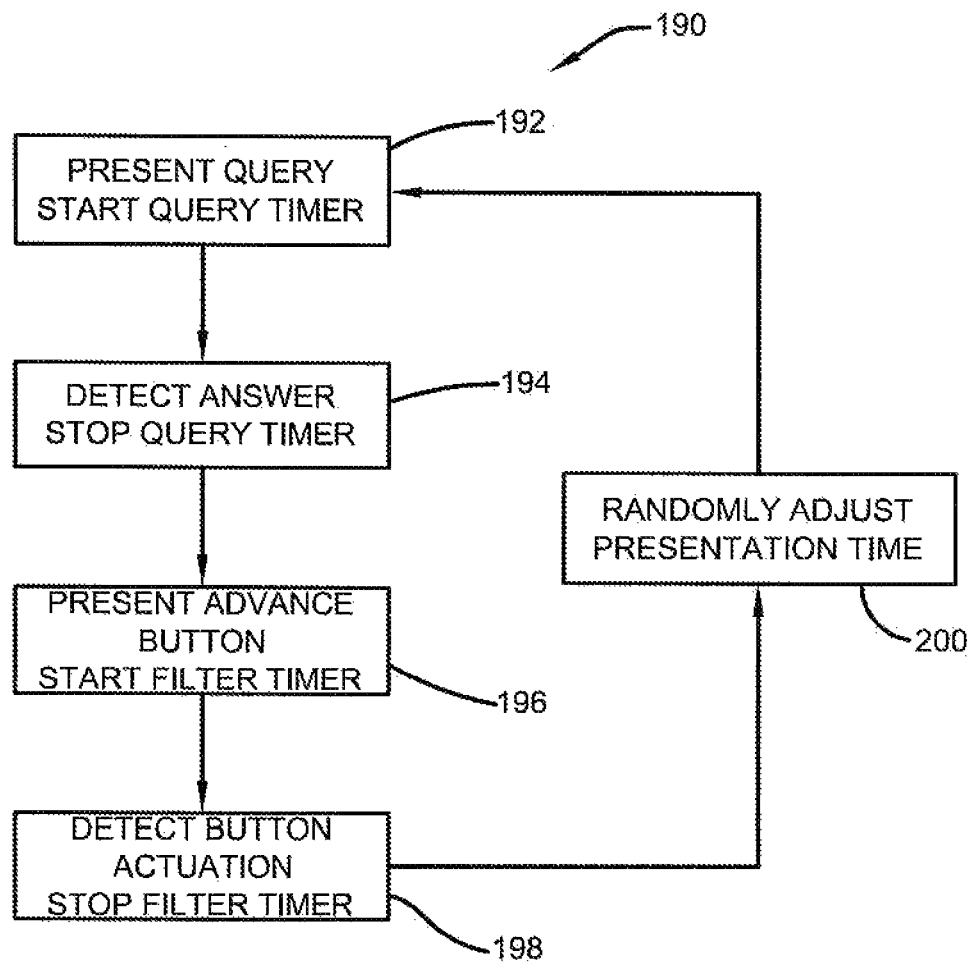
FIG. 7 is a flowchart illustrating the steps for implementing the advance button filter with the system according to the concepts of the present invention.

Referring now to FIG. 7, an advance button flow chart is designated generally by the numeral 190. At step 192 the question 28 is presented and a query timer is started. Next, at step 194 the task engine 26 detects an answer and stops the query timer to obtain the reaction time 30. Following this, at step 196 the screen 180/180' showing the advance button 182 or 186A, 186B is shown and a filter timer is started. Next, at step 198, detection of a button actuation of the advance button 182 or 186A, 186B is detected and the filter timer is stopped. Upon completion of step 198, at step 200 the next query in the task engine is presented within a random delay and then the process is returned to step 192 for the next query. The reaction times and the filter times are collected for later evaluation.

The advance button filter reduces 80 the influence of motor artifacts that occur when answering a series of consecutive queries utilizing a mouse, a touchpad or a touchscreen. Without the advance button filter each consecutive answer can be distorted. In other words, the answer may be too fast if the answer is the same as the answer to the previous query or too slow if the answer to the present query is different than the answer to the previous query due to the cursor/finger positioning and/or uncontrolled manner of how respondents uses their devices. For example, if the question screen shown is simply repeated upon completion of the previous query, then the subject's cursor will already be in a particular position that may allow for an abnormally quick answer. As such, the presentation of the advance button in either FIG. 6A or 6B prevents this from happening. Without an Advance button filter the difference is not caused by the cognitive load, but by motor artifacts; literally, the time a respondent needs to move his or her finger or cursor from one answer to the other versus the time needed to just press the button where movement is not necessary (i.e., when the answer is the same). Construction of the screens is important in presentation of the advance button filter. The filter appears after each query is asked and the advance buttons 182 or 186A, 186B are located equidistant from any response button that is used in a given query on the previous screen. As set out in FIG. 7, the filter may be applied in the test in a series of cycles. First the query is presented and a reaction time is detected when the respondents respond, then a time period is detected with presentation and completion of the advance button filter whereupon another query is presented. This procedure does not influence the reaction time 30 as it is not connected with the use of the advance button. Skilled artisans will appreciate that the buttons presented in FIG. 6A should be an equal distance to the advance button that is presented on the next screen. Moreover, the advance button may be smaller or only slightly bigger than the cursor or fingerprint, depending on the input device to enhance the precision of movement control.

Referring back to FIG. 2, the corresponding buttons filter 90 is utilized prior to the test. The input device 22 provides the input bus 23 with the previously described queries and input variables. The corresponding button filter 90 receives the signal 62 directly from the input device or by signal 62' that passes through the gatekeeper filter 60. The filter 90 generates a signal line 92 received by the results database 36.

The corresponding buttons filter 90 establishes the speed of the respondent's motoric skills from his or her responses. These skills are related to the familiarity with the computer, tablet, mobile phone, or other input device. The filter 90 also tests the respondent's attentional skills, sensorimotor integration and level of arousal (natural, chrono-biological, evoked by stimulants, etc.). Moreover, the use of the filter 90 familiarizes the respondents with a scale that may be used by the task engine and automates the description of the buttons. In other words, the corresponding buttons filter utilizes the filter time from the filter which is then incorporated accordingly. Basically, the corresponding buttons filter provides for a determination of the difference in the reaction time of pressing different buttons. For example, the corresponding buttons filter 90 determines how fast the subject presses a button A or a button B. Thus, the reaction time for pressing button A might be compared to the reaction time for pressing button B or C.

Figure 8A:
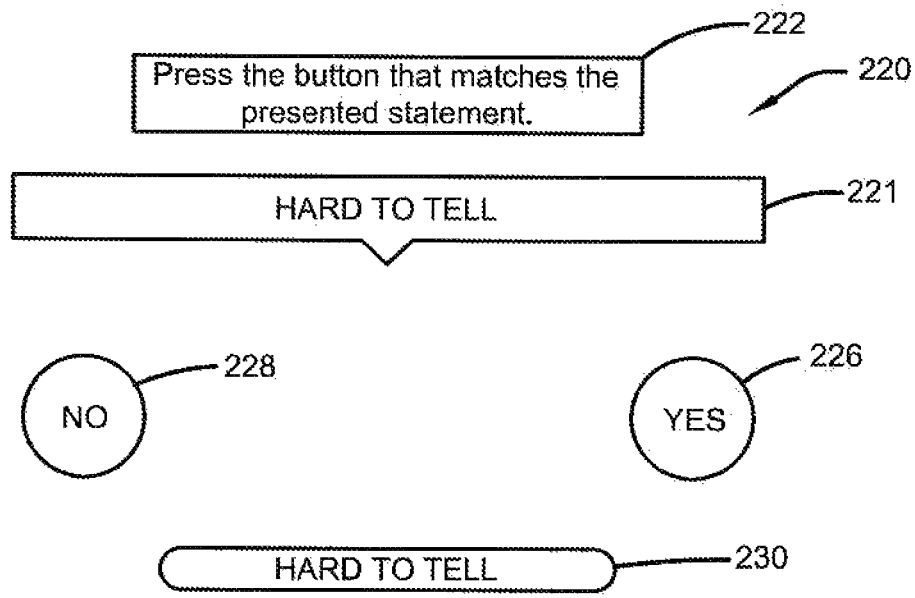
FIGS. 8A and 8B present screen displays utilized with a corresponding buttons filter with the system according to the concepts of the present invention.
Figure 8B:
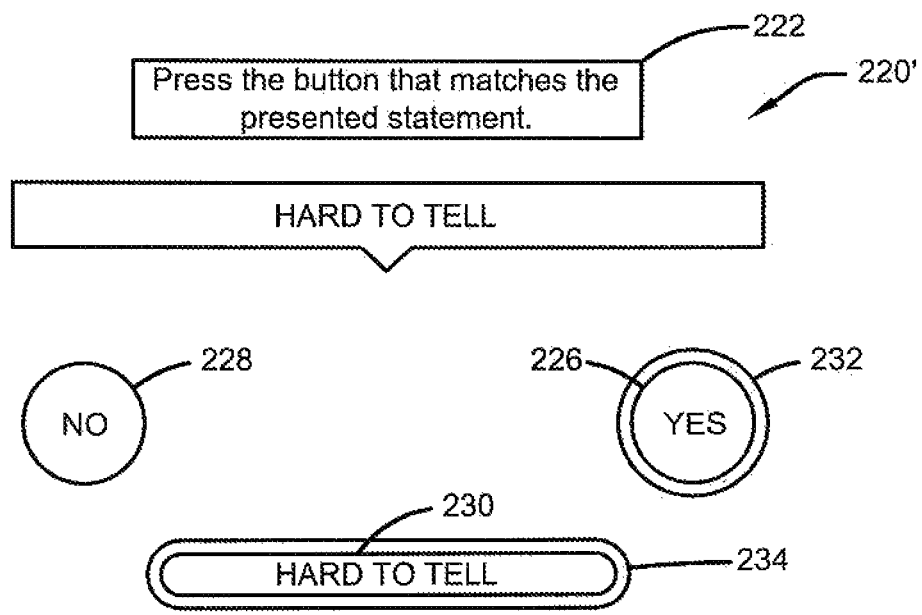

Referring now to FIGS. 8A and 8B, a display screen 220 is presented on the monitor 21 by the task engine 26. The screen 220 includes an instruction 222 which tells the subject to press a button that matches the presented statement. The screen further provides the statement banner 221 and then options for responding to the statement banner. The options might include, for example, a YES button 226, a NO button 228, and a "HARD TO TELL" button 230. The buttons may or may not be strategically placed and/or separated from one another. The buttons should be presented in an exactly the same shape as they will be presented during the main test. Therefore if the test utilizes more or less points on a scale instead of a three (3) point scale (three options) presented, then the filter corresponding button will include those buttons as well. Upon presentation of the screen 220, the user utilizes the input device to reply to the statement button based on the instruction button 222. As seen in FIG. 8B, if the respondent incorrectly replies to the query, a screen 220' presents a highlighted wrong answer 232 along with a highlighted correct answer 234 and the user is again requested to press the correct button based upon the statement button. In one embodiment, the highlighted wrong answer 232 may be marked by a red color and the highlighted corrected answer 234 may be marked by a green color. Other indicators, such as a red cross, a green tick, or other obvious or intuitive indicators, may be employed. As noted previously, these screens familiarize the subject with the format of the statements and answers to be provided. The screens also determine the subject's ability to answer queries and to utilize the input device in the proper manner.

Figure 9:
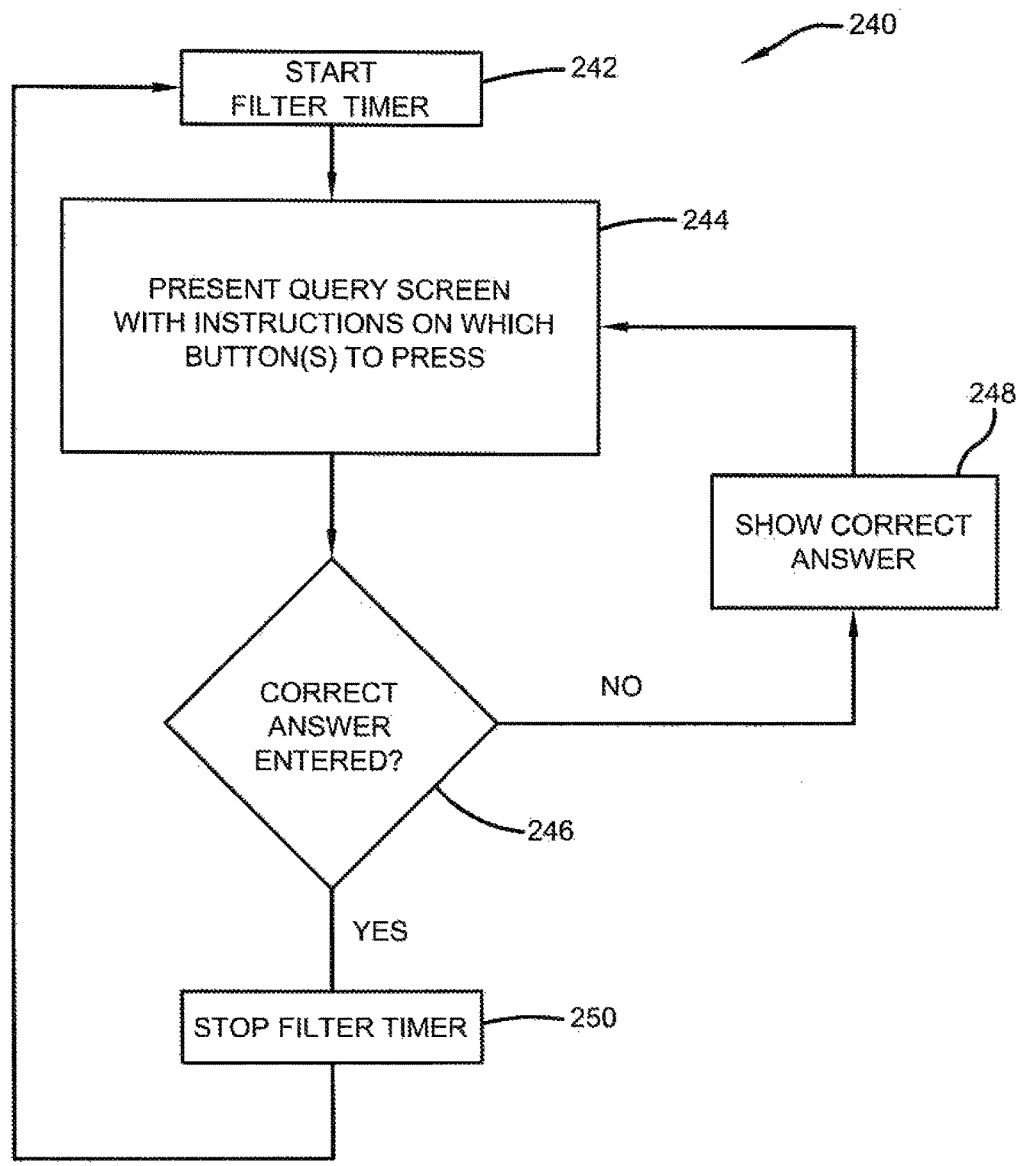
FIG. 9 is a flowchart illustrating the steps for implementing the corresponding buttons filter with the system according to the concepts of the present invention.

Referring now to FIG. 9, the method steps for assessing the subject's responsiveness to the corresponding buttons filter is presented by the numeral 240. Upon presentation of the first screen, a filter timer is started at step 242. Concurrently with starting the timer at step 242, at step 244 a query is presented on the screen with or without instructions on which button or buttons to press. Next, at step 246, if a correct answer is not answered, then at step 248 the screen 220' is presented showing the correct answer and the highlighted wrong answer. As such, the user is then required to actuate the correct answer at step 244. Upon entering the correct answer at step 246 the filter timer is stopped at step 250 and the process return to step 242 and 244 for the presentation of another instruction button and associated statement button.

The screens presented in FIGS. 8A and 8B provide for a three point scale. In other words, there are three options—no, yes, hard to tell—for the subject to consider. The query 28 associated with this filter will present a similar format so that the data collected during operation and use of the corresponding buttons filter will be relevant to the task engine and its results. As skilled artisans will understand, the scale is the term utilized to describe the possible answers. In another embodiment where there is only a YES or NO answer, a two point scale is provided. In other embodiments, there can be more answers with more points on the scale. For example, a five point scale would consist of answers provided as—never, rare, sometimes, often, always.

Referring back to FIG. 2, the length of words filter 100 is implemented prior to the test. In this embodiment, the task engine 26 generates a response time data that is entered for each response, wherein the query 28 presented is classified by the number of characters in the query. The filter 100 then generates a data signal 102 that is received by the results database 36.

Figure 10:
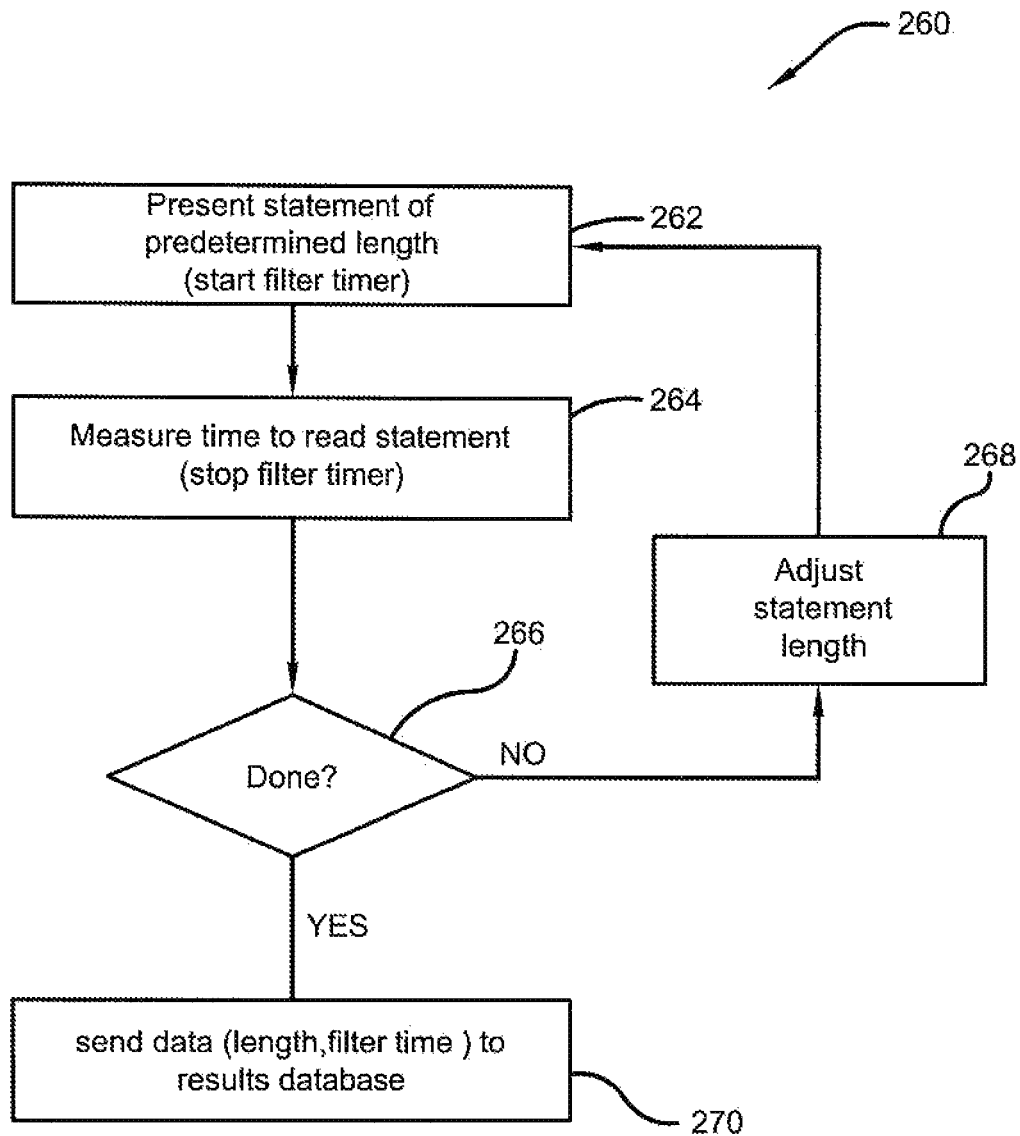
FIG. 10 is a flowchart illustrating the steps for implementing a length of words filter with the system according to the concepts of the present invention.
Figure 11:
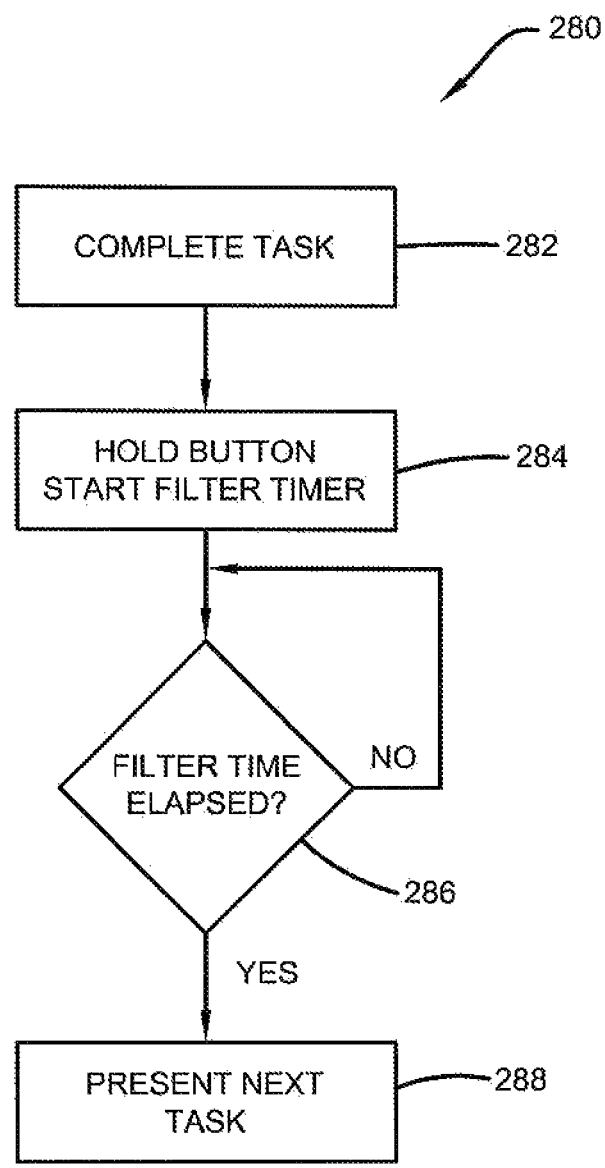
FIG. 11 is a flowchart illustrating the steps for implementing a settle down filter with the system according to the concepts of the present invention.

Referring now to FIG. 10, a flowchart for the length of words filter is designated generally by the numeral 260. At step 262 a statement is presented of predetermined length and a filter timer is started. Next, at step 264, the statement is read by the subject and acknowledged by actuating a button that the statement has been read and then the filter timer is stopped. At step 266 it is determined whether the length of words filter is complete or not. If not, then at step 268 the statement length is adjusted in some manner by adding or decreasing the words or characters in the statement presented at step 262. Once a sufficient number of different number of character lengths have been presented at step 268 and 262, then at step 266 the process is considered completed and continues to step 270 where the data accumulated in the filter, such as the length of the statement and the filter time to obtain the result, is sent to the database 36 via the signal line 102.

The length of words filter controls the influence that the varying length of the statements may have on the process and attempts to minimize this influence. The length of word filter checks the speed of processing statements of different length (such as short, medium or long). In one embodiment, these statements are presented at the beginning of a test—before the main part of the test. In such an embodiment the only task given to the respondent is to "press the response button as soon as you have read the statement." There is no cognitive evaluation component for this filter, so only the pure reaction to the statement itself and speed of reading is established. These scores are taken into consideration during the main part of the test to see if the respondent has read the statement and to compare the speed of his or her reading with that of his or her reading and evaluation of statements.

Referring back to FIG. 2, a settle down filter 110 may be employed prior to or during the test. In this embodiment, the task engine 26 is implemented as previously described, but the task engine 26 generates task engine data results 112 that are sent to the settle down filter 110. The results after implementation of the settle down filter 404 are transferred back to the task engine.

Referring now to FIG. 10 a flowchart showing operation of the settle down filter is designated generally by the numeral 280. Once a query or series of queries is completed by the respondent at step 282, the respondent is instructed to hold a designated button on the input device for a predetermined period of filter time at step 284. The process, at step 286, then determines when the time period has elapsed at step 286. Once the time period has elapsed, at step 288, the respondent is returned to the task engine to continue with the next query 28.

The settle down filter reduces the influence of arousal level and the effect of familiarity with the task engine or reaction time task. This is done by instructing the respondent to keep his or her fingers in one place on a touchscreen type device for a given length of time. Once the time is completed, then the respondent is allowed to proceed with the test or next query presented by the task engine 26. This type of filter keeps the user form randomly answering queries without giving due consideration to the query being asked. In other words, after completion of a query the user must go through the settle down filter 110 so that the presentation of the next query is not unduly influenced by the previous query. This procedure maintains the emotional state of the respondent at certain level and keeps the respondent's individual emotional characteristics at constant level throughout the task.

Referring back to FIG. 2, the learning curve filter 120 is implemented after the test. In this embodiment, the task engine 26 transfers task engine data results 35 to the learning curve filter 120. The respondent then answers a series of queries associated with the learning curve filter and this data is transferred directly to the results database 36.

The learning curve filter helps to control the influence of the order of queries. During the test, the queries appear in random order and each respondent is watching a different sequence of the queries. Nevertheless, the respondents may have different learning capabilities and one respondent may be able to familiarize with the test faster than another respondent. So as to compensate for these differences, the filter 120 calculates the individual characteristics regarding the respondent and the length of the queries that are being answered.

Figure 12:
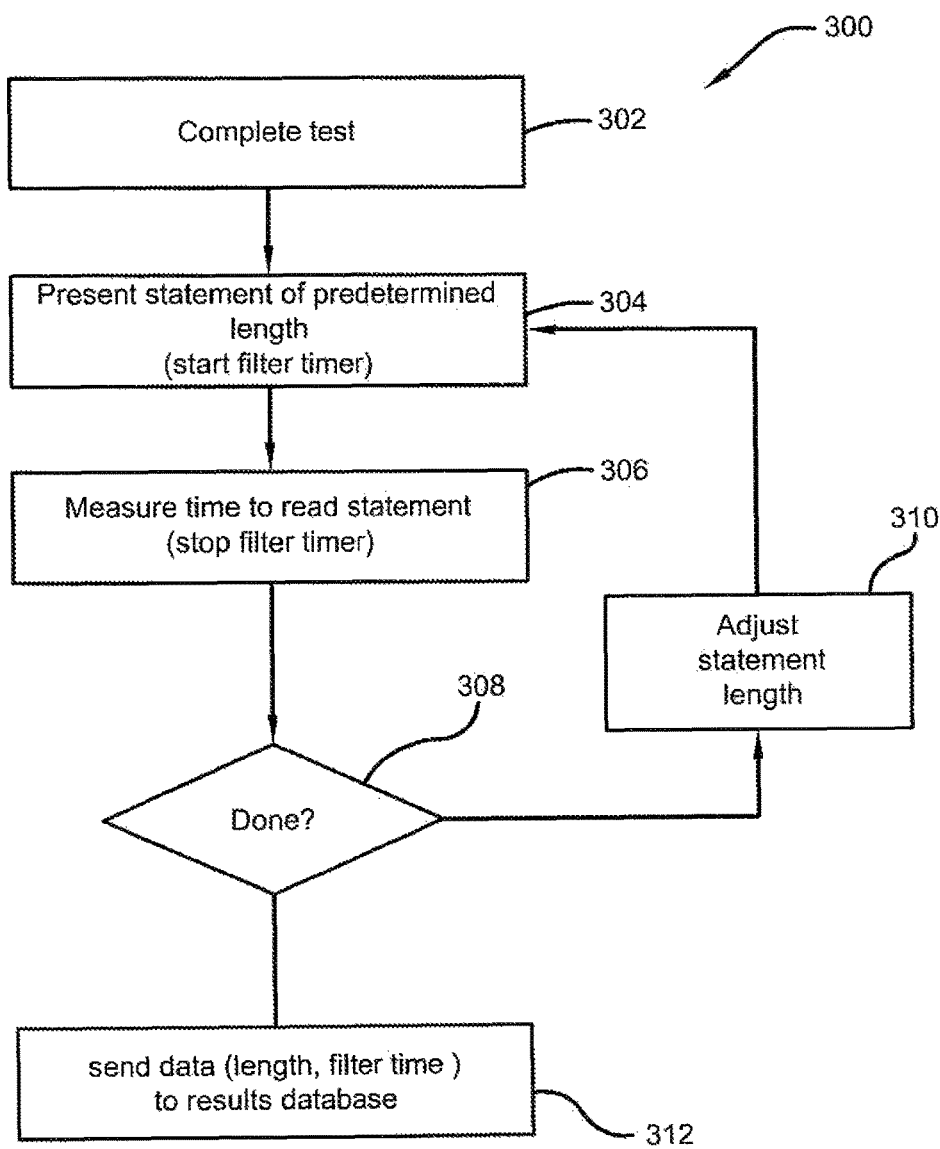
FIG. 12 is a flowchart illustrating the steps for implementing a learning curve filter with the system according to the concepts of the present invention.

Referring now to FIG. 12, the flowchart for the learning curve filter is designated generally by the numeral 300. At step 302, the question 28 to complete the task is completed at step 302. Next, at step 304, a filter timer is started and a statement is read by the subject and completion is acknowledged by actuating a button that the statement has been read and then the timer is stopped at step 306. At step 308 it is determined whether the length of words filter is complete or not. If not, then at step 310 the statement length is adjusted in some manner by adding or decreasing the words in the statement and represented at step 304. Once a sufficient number of different lengths of statements have been presented at step 304, then at step 308 the process is considered completed and continues to step 312 where the data accumulated in the filter, such as the length of the statement and the filter time to obtain the result, is sent to the results database 36 via the signal line 102 for filtering the results obtained when running the task engine 26.

The learning curve filter 120 is substantially similar to the length of words filter 100 but with queries immediately after the main part of the study presented by the task engine. The actual length of the words used in the learning curve filter are substantially the same as the length of words filter. This allows for comparison between groups of queries with the same length and establishes the learning effect which means how much the speed of the response is facilitated through the process of taking the test provided in the task engine. The learning curve filter is a function that describes the relation of acceleration of the reaction time and the number of queries asked.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A system for filtering results from tests that include reaction time as part of the test results, comprising:
   an input device that receives respondent input in response to queries;
   a task engine associated with said input device, said task engine presenting said queries and receiving respondent's input to queries and associating a reaction input time for each said respondent's input;
   a results database for receiving said respondent's input and said associated reaction input time; and
   a length of words filter associated with said task engine so as to compensate for artifacts that adversely affect said associated reaction input time, wherein prior to presenting queries to said respondent, said task engine presents statements of different word length to said respondent who confirms reading each statement so as to generate a filter time, and said task engine associates said filter time with said respondent's reaction input time in said results database.

2. A system for filtering results from tests that include reaction time as part of the test results, comprising:
   an input device that receives respondent input in response to queries;
   a task engine associated with said input device, said task engine presenting said queries and receiving respondent's input to queries and associating a reaction input time for each said respondent's input;
   a results database for receiving said respondent's input and said associated reaction input time; and
   a learning curve filter associated with said task engine so as to compensate for artifacts that adversely affect said associated reaction input time, wherein after presenting queries to said respondent, said task engine presents statements of different word length to said respondent who confirms reading each statement so as to generate a filter time, and wherein said learning curve filter determines said filter time related to learning capabilities and said task engine associates said filter time with said respondent's reaction input time in said results database.

3. A system for filtering results from tests that include reaction time as part of the test results, comprising:
   an input device that receives respondent input in response to queries;
   a task engine associated with said input device, said task engine presenting said queries and receiving respondent's input to queries and associating a reaction input time for each said respondent's input;
   a results database for receiving said respondent's input and said associated reaction input time; and
   a settle down filter associated with said task engine so as to compensate for artifacts that adversely affect said associated reaction input time, wherein said respondent maintains said input device in a specified state for a predetermined filter time until said task engine can present a next query on said input device.

4. A system for filtering results from tests that include reaction time as part of the test results, comprising:
   an input device that receives respondent input in response to queries;
   a task engine associated with said input device, said task engine presenting said queries and receiving respondent's input to queries and associating a reaction input time for each said respondent's input;
   a results database for receiving said respondent's input and said associated reaction input time; and
   at least one filter associated with said task engine so as to compensate for artifacts that adversely affect said associated reaction input time, wherein said at least one filter determines a filter time based on placement of answer buttons on said input device and said task engine associates said filter reaction time with said respondent's reaction input time in said results database.

5. The system according to claim 4, wherein said at least one filter comprises:
   an advance button filter wherein after completing a query by said respondent, said task engine presents a screen requiring respondent's input on a position of said input device different than a position used in answering said query.

6. The system according to claim 4, wherein said at least one filter comprises:
   a corresponding buttons filter wherein said task engine presents a query and answer to said respondent to answer said query and said task engine associates said filter time to said results database.

7. A system for filtering results from tests that include reaction time as part of the test results, comprising:
   an input device that receives respondent input in response to queries;
   a task engine associated with said input device, said task engine presenting said queries and receiving respondent's input to queries and associating a reaction input time for each said respondent's input;
   a results database for receiving said respondent's input and said associated reaction input time;
   a gatekeeper filter associated with said task engine so as to compensate for artifacts that adversely affect said associated reaction input time, wherein said task engine presents at least one monitor where said respondent must designate an element that is different from other elements on said monitor to determine a filter time for comparison to a predetermined threshold; and
   a benchmark reference database associated with said gatekeeper filter to ensure said respondent's reaction input time meets said predetermined threshold maintained in said benchmark reference database prior to said task engine presenting said queries.

8. A system for filtering results from tests that include reaction time as part of the test results, comprising:
   an input device that receives respondent input in response to queries;
   a task engine associated with said input device, said task engine presenting said queries and receiving respondent's input to queries and associating a reaction input time for each said respondent's input;
   a results database for receiving said respondent's input and said associated reaction input time;
   a scratcher filter associated with said task engine so as to compensate for artifacts that adversely affect said associated reaction input time, wherein said task engine presents a monitor with multiple virtual layers that said respondent must remove with said input device to determine a filter time at least one time for comparison to a predetermined threshold; and a benchmark reference database associated with said scratcher filter to ensure said respondent's reaction input time meets said predetermined threshold maintained in said benchmark reference database prior to said task engine presenting said queries.

9. A method for filtering test results that include a reaction time as part of the result, the method comprising:
presenting by a task engine a query or series of queries to a respondent;
determining an input reaction time for said respondent using an input device to reply to said query;
associating at least one filter with said task engine, wherein said at least one filter includes a filter timer that generates a filter time specific to said respondent and said input device;
implementing said at least one filter prior to presenting said query or series of queries to said respondent, wherein said at least one filter is selected from the group consisting of a length of words filter, a scratcher filter, a gate keeper filter and a corresponding buttons filter; and
associating said query, said respondent's input, said respondent's input reaction time in responding to said query, said filter time, and said input device with one another in a results database.

10. A method for filtering test results that include a reaction time as part of the result, the method comprising:
presenting by a task engine a query or series of queries to a respondent;
determining a reaction time for said respondent using an input device to reply to said query;
associating an advance button filter with said task engine, wherein said advance button filter includes a filter timer that generates a filter time specific to said respondent and said input device;
implementing said advance button filter during presentation of said series of queries to said respondent or after completion of each said query in said series of queries;
randomly adjusting presentation of a next query upon completion of said advance button filter; and
associating said query, said respondent's input, said respondent's input reaction time in responding to said query, said filter time, and said input device with one another in a results database.

11. A method for filtering test results that include a reaction time as part of the result, the method comprising:
presenting by a task engine a query or series of queries to a respondent;
determining a reaction time for said respondent using an input device to reply to said query;
associating at least one filter with said task engine, wherein said at least one filter includes a filter timer that generates a filter time specific to said respondent and said input device;
implementing said at least one filter after presenting said query or series of queries to said respondent, wherein said at least one filter is selected from the group consisting of a learning curve filter and a settle down filter; and
associating said query, said respondent's input, said respondent's input reaction time in responding to said query, said filter time, and said input device with one another in a results database.

12. A method for filtering test results that include a reaction time as part of the result, the method comprising:
presenting by a task engine a query or series of queries to a respondent;
determining a reaction time for said respondent using an input device to reply to said query;
associating at least one filter with said task engine, wherein said at least one filter includes a filter timer that generates a filter time specific to said respondent and said input device;
implementing said at least one filter in association with presenting said query or series of queries to said respondent, wherein said at least one filter is selected from the group consisting of a scratcher filter, a gate keeper filter, a corresponding buttons filter, an advance button filter, a length of words filter, a learning curve filter and a settle down filter; and
associating said query, said respondent's input, said respondent's input reaction time in responding to said query, said filter time, and said input device with one another in a results database.

* * * * *